United States Patent [19]

Fukushima et al.

[11] Patent Number: 4,518,901
[45] Date of Patent: May 21, 1985

[54] MOTOR CONTROL APPARATUS

[75] Inventors: Isao Fukushima; Yasunori Kobori; Hideo Nishijima; Yoshinori Masuda, all of Katsuta, Japan

[73] Assignee: Hitachi, Ltd., Tokyo, Japan

[21] Appl. No.: 454,028

[22] Filed: Dec. 28, 1982

[30] Foreign Application Priority Data

Jan. 6, 1982 [JP] Japan ................................. 57-304

[51] Int. Cl.³ ............................................... G05B 5/00
[52] U.S. Cl. ..................................... 318/328; 318/314; 318/318; 318/326; 323/281
[58] Field of Search ............... 318/318, 314, 326, 327, 318/328; 307/519, 352; 323/281

[56] References Cited

U.S. PATENT DOCUMENTS

| 3,602,825 | 8/1971 | Senior ........................... 307/352 X |
| 3,867,647 | 2/1975 | Callahan et al. ................. 307/519 |
| 4,338,554 | 7/1982 | Fukushima et al. ............... 318/328 |
| 4,366,399 | 12/1982 | Furuhata ........................ 318/318 X |

Primary Examiner—Ulysses Weldon
Attorney, Agent, or Firm—Antonelli, Terry & Wands

[57] ABSTRACT

A motor control apparatus for driving and controlling a motor, in which a signal frequency proportional to a rotation number of the motor is converted into a d.c. voltage by a frequency/voltage converter so as to drive and control the motor by the d.c. voltage. The apparatus comprises a first, a second, and a third pulse generator for successively producing a first, a second, and a third repetitive pulse, respectively, in response to a signal period proportional to the rotation number of the motor; a constant current source; a first reset circuit driven by the third pulse to reset an output current of the constant current source; a first capacitor connected to the first reset circuit in parallel with the first reset circuit and charged by the output current of the constant current source; a sampling circuit driven by the second pulse to derive a saw tooth wave signal appearing across the first capacitor; a second reset circuit driven by the first pulse; a second capacitor connected to the second reset circuit in parallel therewith for charging the saw tooth wave signal through the sampling circuit; and a circuit for changing a pulse width of at least one of the first, second and third pulses substantially in accordance with the output current of the constant current source.

9 Claims, 36 Drawing Figures

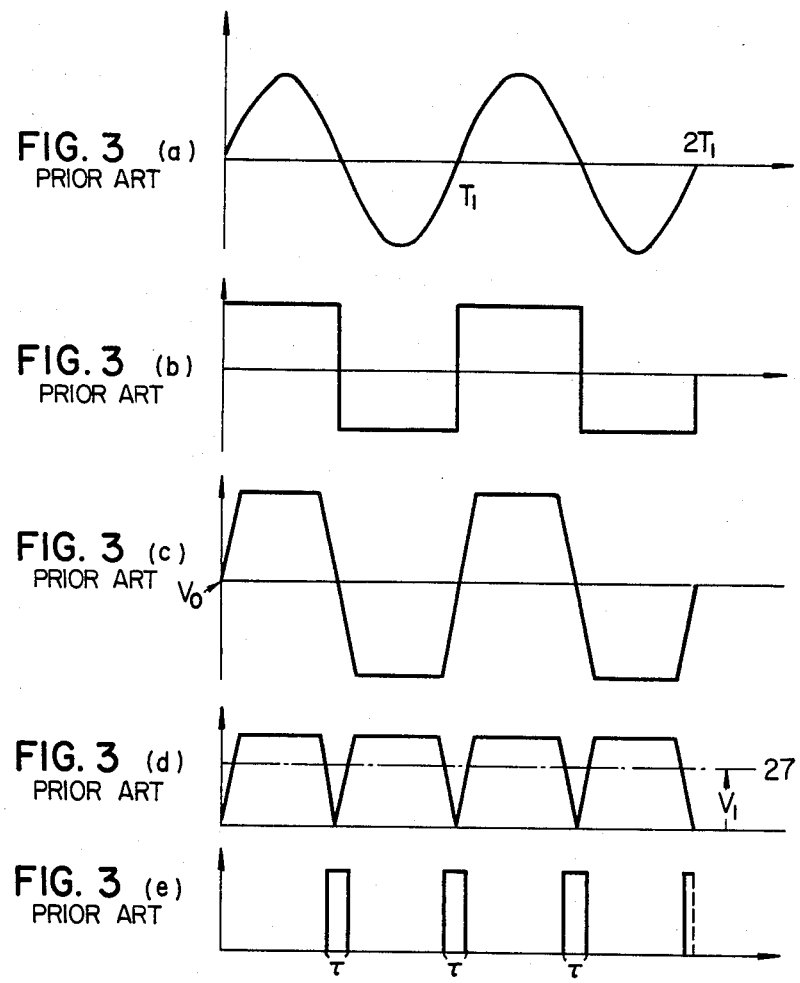

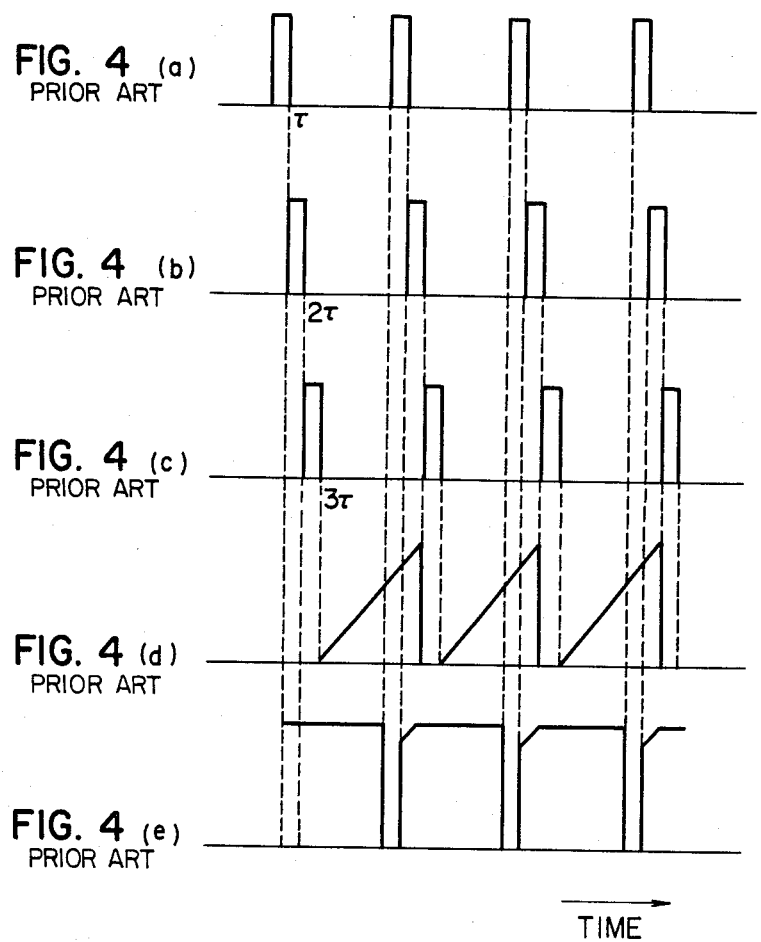

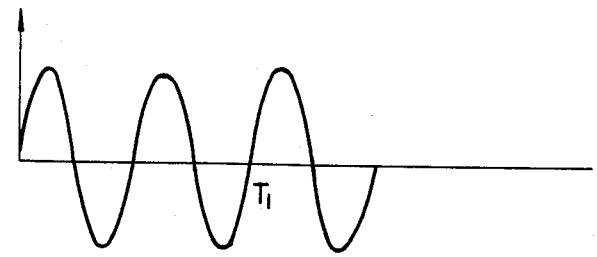
FIG. 5 (a) PRIOR ART
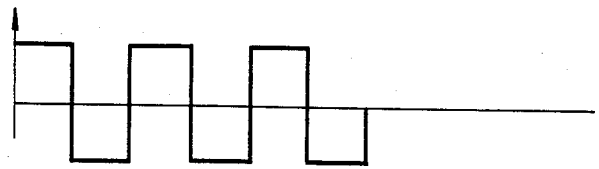
FIG. 5 (b) PRIOR ART
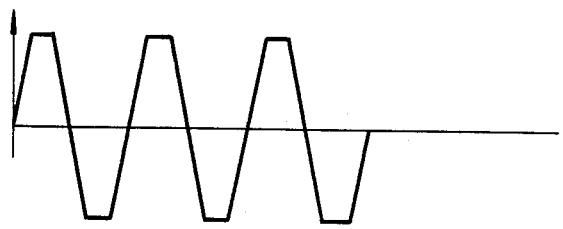
FIG. 5 (c) PRIOR ART
FIG. 5 (d) PRIOR ART
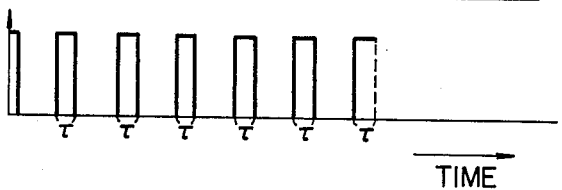
FIG. 5 (e) PRIOR ART

TIME

TIME

F I G. 12
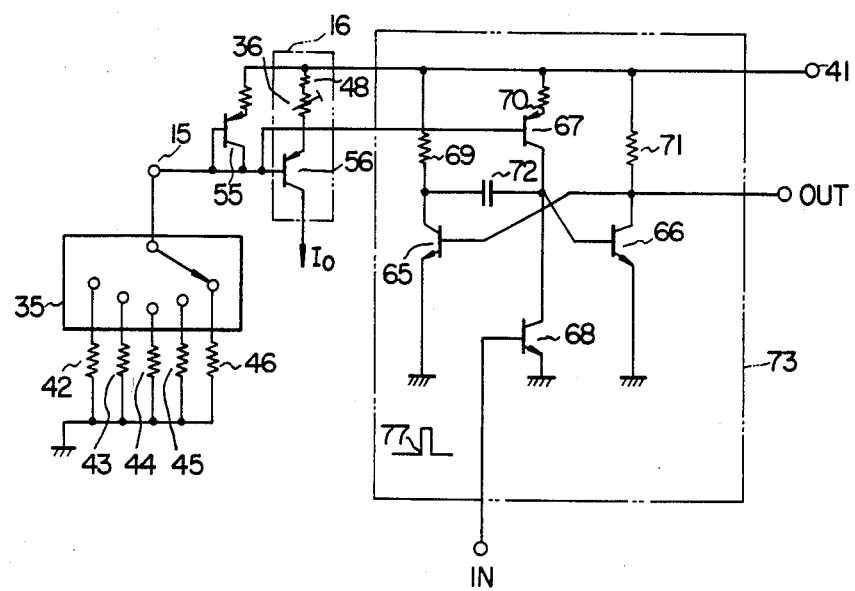

MOTOR CONTROL APPARATUS

The invention relates to a motor control apparatus and particularly to an apparatus for controlling the number of rotation of a motor in which a plurality of motor rotation numbers are set.

U.S. Pat. No. 4,338,554 assigned to the same assignee as the present application discloses a conventional automatic gain control apparatus to which the present invention is applied.

FIG. 1 is a block diagram of a conventional motor rotation number control circuit which is constituted by a frequency/voltage converter 1, an error voltage amplifier 2, a motor driving circuit 3 and a rotation number detector 4. In FIG. 1, a signal having a frequency proportional to the rotation number of a motor 5 is derived by the rotation number detector 4 and converted into a d.c. voltage by the frequency/voltage converter 1. The d.c. voltage is compared in the error voltage amplifier 2 with a reference voltage of a reference voltage source 6 and the error voltage amplifier 2 produces an error voltage as the result of comparison. The motor driving circuit 3 power-amplifies the error voltage so as to drive the motor 5. In this manner, the circuit operates to make smaller the difference voltage between the output d.c. voltage of the frequency/voltage converter 1 and the voltage of the reference voltage source 6 so as to perform the speed control.

FIG. 2 is a block diagram showing the configuration of the frequency/voltage converter 1 (hereinafter referred to as f-v converter) as well as a method of setting the rotation number. In FIG. 2, the signal shown in FIG. 3(a) and applied to a terminal 7 from the motor rotation number detector 4 (FIG. 1) is sufficiently amplified by an amplifier 8 and then subject to amplitude limiting by a limiter 9 to be waveshaped to approach a complete rectangular wave as shown in FIG. 3(b). A trapezoidal wave generator 10 comprises a constant current source 25 for supplying a constant current, another constant current source 26 for drawing a constant current to the ground, a capacitor 22 having a capacitance value C, a reference voltage source 63 and clamping diodes 62 and 64. In a first half cycle of the signal shown in FIG. 3(b), the constant current source 25 is driven to charge the capacitor 22 by a constant current I and in the next half cycle, the constant current source 26 is driven to discharge the capacitor 22 with the current I. The change of voltage of the capacitor with respect to time t is $(1/C) \cdot t$ and therefore if the current I is properly selected, the capacitor is charged/discharged in each half cycle to beyond a threshold voltage $V_F$ of the clamp diode around the reference voltage $V_o$ of the reference voltage source 63 so as to obtain a trapezoidal wave as shown in FIG. 3(c). The trapezoidal wave is full-wave rectified in a full-wave rectifier 11 to have a waveform as shown in FIG. 3(d) and then subject to on/off control by a blind sector circuit 12 with a threshold voltage $V_1$ as indicated by the reference numeral 27 in FIG. 3(d) so as to obtain a train of pulses having a pulse width $\tau$ as shown in FIG. 3(e). FIG. 4(a) shows the same waveform as that shown in FIG. 3(e). The pulse of FIG. 4(a) drives a reset switch 19 of FIG. 2 and at the same time triggers by its trailing edge a delay pulse generating circuit 13 typically composed of a monostable multivibrator and for producing a predetermined pulse so that the circuit 13 produces a pulse having a suitable pulse width, for example $\tau$ as shown in FIG. 4(b), so as to drive a sampling switch 18. The output pulse of the circuit 13 causes by its trailing edge another delay pulse generating circuit 14 similar to the circuit 13 to produce a pulse having a pulse width $\tau$ as shown in FIG. 4(c). The output pulse of the circuit 14 drives a reset switch 17. In this circuit arrangement, the charge of a capacitor 20 over a predetermined period by a constant current $I_o$ from a constant current source 16 and the instant discharge of the same are alternately repeated so as to obtain a saw tooth wave as shown in FIG. 4(d). The peak value of the saw tooth wave is in proportion to the rotation number of the motor, and therefore the sampling and holding of the peak value may provide the f-v conversion of the saw tooth wave. To this end, it will do to actuate the sampling switch 18 to operate immediately before the operation of the reset switch 17. The sampling switch 18 is actuated by the output of the pulse generating circuit 13. Further, in order to obtain a hold voltage always proportional to the rotation number of the motor, it is necessary to reset the voltage of a hold capacitor 21 at every sampling operation and therefore the reset switch 19 is operated by the pulse of FIG. 4(a) so as to reset the voltage of the capacitor 21. Thus, the voltage waveform of the hold capacitor 21 is as shown in FIG. 4(e). This voltage across the capacitor 21 is derived through a low pass filter 23 so as to obtain a d.c. voltage substantially corresponding to the peak value of a triangular wave, that is proportional to the period of rotation, at a terminal 24. This d.c. voltage is applied to the error amplifier 2 of FIG. 1, and a signal corresponding to the difference between the d.c. voltage and the voltage having a properly fixed value of the reference voltage source 6 is applied to the motor driving circuit 3 to drive the motor 5, so that a negative feedback is performed such that the difference voltage between the voltage of the reference voltage source 6 and the output voltage of the f-v converter 1 is made smaller to control the rotation number of the motor 5. To increase the rotation number, the current $I_o$ of the constant current source 16 is increased by an external signal applied to a terminal 15 and the incline of the saw tooth wave of FIG. 4(d) is made large. Accordingly, the voltage level of the waveform of FIG. 4(e) becomes higher than the fixed voltage of the reference voltage source 6. Under the condition, a difference voltage to increase the rotation number of the motor is applied to the motor driving circuit 3 so as to accelerate the motor 5. The acceleration continues till the voltage level of FIG. 4(e) reaches near the reference voltage of the reference voltage source 6 of the error signal amplifier 2.

In such a conventional arrangement, even if the pulse width is selected to a fixed value in the respective waveforms of FIGS. 4(a), (b), (c), the smoothed voltage of FIG. 4(e) is not affected if the pulse width is previously selected to a small value offering no problem in the case the rotation number of the motor is set to various values in a narrow range. In the case the rotation number is set to various values in a wide range and the rotation number is selected to be larger, on the other hand, there arises a problem that the smoothed voltage may be affected by the pulse width for driving the sampling or reset switch.

For example, assume that the current $I_o$ of the constant current source 16 of FIG. 2 is increased and that the rotation number is set to be doubled as shown in FIG. 5(a) relative to that shown in FIG. 3(a). The waveforms of FIGS. 3(b)~(e) correspond those of FIGS. 5(b)~(e) and the waveforms of FIGS. 4(b)~(e) correspond FIGS. 6(b)~(e), so that the rate of occupation of the pulse width of each pulse with respect to the signal period inversely proportional to the rotation number becomes large and the smoothed voltage of FIG. 6(e) is not the desired value. That is, first, there arise problems that:

(1) A ripple wave component having the same pulse width as that of the pulse for driving the reset switch 19 appears; and (2) The period occupied by the sampling pulse width becomes longer relative to the signal period inversely proportional to the rotation number and the period for sampling a part of the saw tooth wave becomes longer, so that the ripple components with respect to the sampling period increase. To eliminate the ripple components, it is necessary to use a filter having a large time constant.

Secondly, the increase of the ripple components means the decrease of the d.c. components, so that it is necessary to increase the current of the constant current source 16 additionally by a value corresponding to the decrease of d.c. voltage components, in order to obtain a d.c. voltage corresponding to the rotation number. For this, not only the linearity of the relation between the rotation number and the constant current $I_o$ is lost but also the necessity of a large current to be passed through a PNP transistor of the constant current source of FIG. 7, which is a typical configuration of the constant current source 16 of FIG. 2, is caused. When the configuration of FIG. 2 circuit is composed of ICs, not only the d.c. current amplification $h_{fe}$ of the PNP transistor in the semiconductor IC is lower than that of the NPN transistor but also the deterioration of the PNP transistor is distinguishable in the range of large current and the extent thereof scatters. When the rotation number is set to a plurality of values, it will do to change the current flowing out of the terminal 15 by changing the resistance value to be connected to the terminal 15 by a switch 35. However, since the scatter of the d.c. current amplification $h_{fe}$ of the PNP transistor as well as the scatter of the extent of the deterioration of the d.c. current amplification $h_{fe}$ in the range of large current can not be estimated, it is required to provide a plurality of variable resistors 36~40 corresponding to the respective rotation numbers to be set, as shown in FIG. 7.

Thirdly, there arises a problem that when the rotation number is set to be large in the circuit of FIG. 2, the output waveform produced by the trapezoidal wave generating circuit and shown in FIG. 5(c) approaches a triangular wave and the amplitude thereof becomes small so that the threshold voltage of the blind sector circuit 12 typically composed of a Schmitt trigger circuit can not be reached to thereby make the circuit 12 inoperative.

An object of the present invention is to solve the above-mentioned problems and to provide a motor control apparatus in which the range of setting the rotation number is wide with a few number of adjustments.

According to an aspect of the present invention, in an arrangement of a frequency/voltage converter in which the peak value of saw tooth wave having a period corresponding to the rotation number is sampled and held, the pulse widths of various pulses for generating the saw tooth wave and various pulses for sampling and holding operations are changed in accordance with the change of the setting of the rotation number so as to reduce the influence of the pulse width of the output voltage of the frequency/voltage converter to thereby provide a stabilized motor control apparatus.

FIGS. 3a–3e and 4a–4e are waveforms for explaining the operation of the case of FIGS. 1 and 2;

FIGS. 5a–5e and 6a–6e are waveforms for explaining the operation of the circuit of FIG. 2 in the case the rotation number of the motor is set doubled relative to that of the case in FIGS. 1 and 2;

Figure 8:
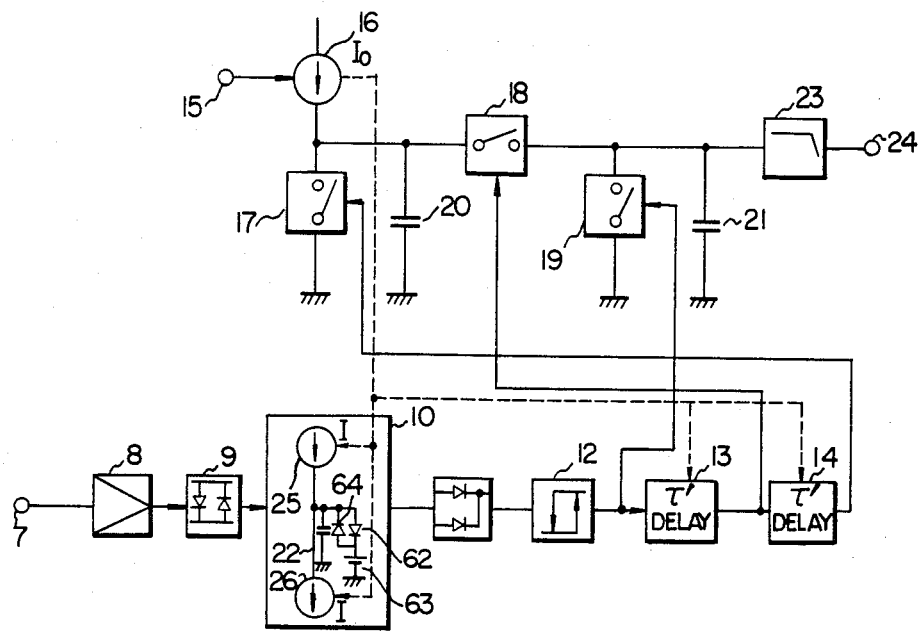
FIG. 8 is a block diagram illustrating an embodiment of the present invention.
Figure 9:
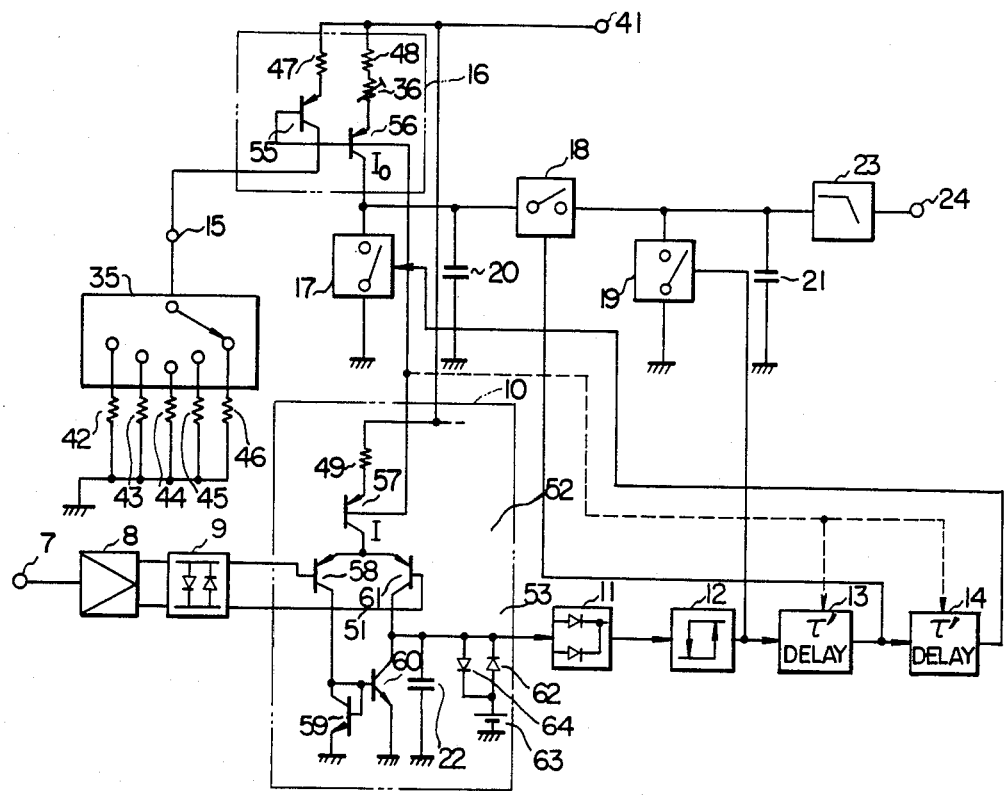
FIG. 9 is a block diagram illustrating a particular embodiment of FIG. 8.

FIGS. 10a–10e and 11a–e are waveforms for explaining the operation of the circuit of FIGS. 8 and 9; and FIG. 12 is a circuit diagram illustrating an example of a monostable multivibrator having a variable pulse width.

Figure 1:
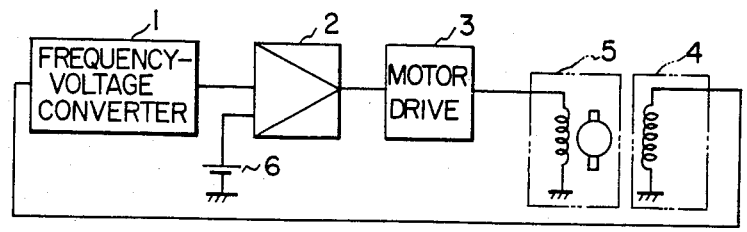
FIG. 1 is a block diagram of a conventional motor rotation number control circuit.
Figure 2:
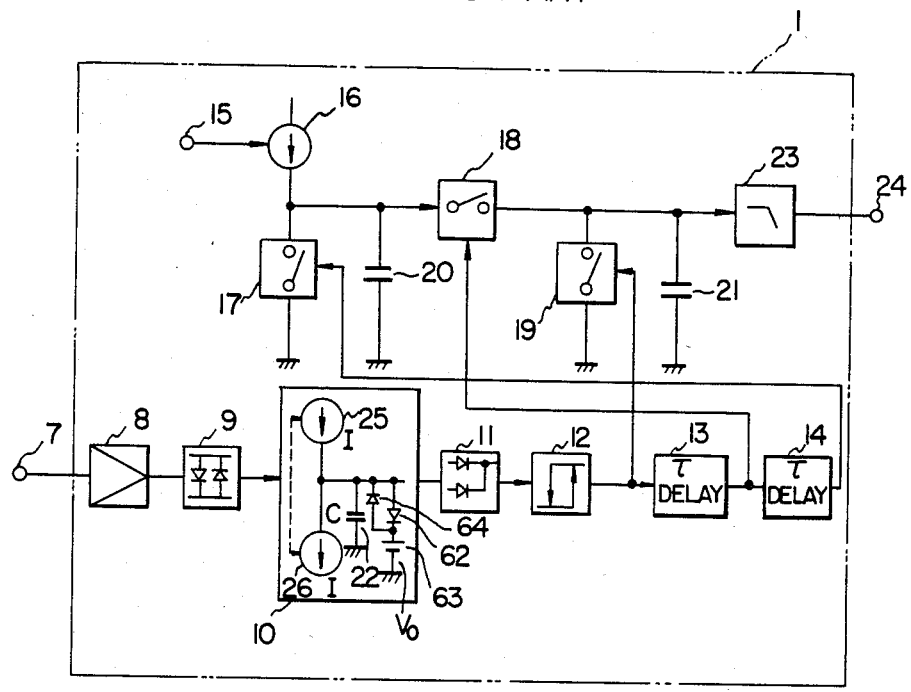
FIG. 2 is a block diagram of a frequency/voltage converter used in the circuit of FIG. 1.
Figure 6A:
Figure 6B:
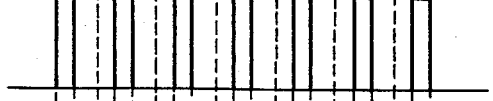
Figure 6C:
Figure 6D:
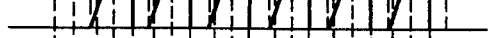
Figure 6E:
Figure 7:
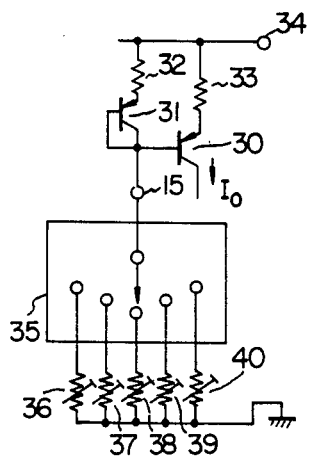
FIG. 7 shows a common example of the configuration of a constant current source.

An embodiment of the present invention will be described hereinunder by referring to FIGS. 8 and 9. In FIGS. 8 and 9, the parts having the same functions as those in FIG. 2 are annexed with the same reference numerals. The case where the rotation number of the motor 5 which has been so far controlled toward a setting rotation number $\omega_o$ is set to be doubled. The constant current of the constant current source 16 for providing the rotation number $\omega_o$ is represented by $I_o$, and the current of the current supply constant current source 25 and the current absorbing constant current source 26 is represented by I. To double the rotation number, it will do to double the constant current of the constant current source 16 by a signal externally applied to the terminal 15. Theoretically, the incline of the saw tooth wave generated across the capacitor 20 is made doubled and the time until the voltage of the reference voltage source 6 of the error amplifier 2 is reached is made one half, so that the double rotation number has been set. At this time, as described above, the pulse width for driving the reset switch 17 may provide its influence when the same pulse width is used as that in the case where the rotation number $\omega_o$ has been set, the time unit the voltage of the reference voltage source 6 of the error amplifier 2 of FIG. 2 has been reached is not always made to be one half of the original value so that, strictly speaking, the rotation number could not be made doubled. To improve this, as shown by dotted line in FIG. 8, both the value of constant current of each of the constant current sources 25 and 26 in the trapezoidal wave generator 10 and the value of pulse width of each of the pule generating circuits 13 and 14 are changed corresponding to the change of current of the constant current source 16. First, the trapezoidal wave will be considered. If the current $I_o$ is made doubled, it will do to make the current I doubled. FIG. 10(a) shows the state that the rate of occupation by the pulse width is made constant according to the present invention relative to the signal period of the rotation number detector 4 of FIG. 1, when the rotation number is set to be double of that shown in FIG. 3(a). That is, if the current of each of the constant current sources 25 and 26 is changed in accordance with the setting of the rotation number, the incline of the trapezoidal is also proportionally changed as that shown by solid line in FIG. 10(c), while when the constant current of each of the constant current sources 25 and 26 are not changed as in the conventional case, the waveforms are as shown by dotted lines in FIGS. 10(c), (d) and (e). Accordingly, if the waveform shown by solid line in FIG. 10(c) is rectified through the full-wave rectifier 11 and then applied to the blind sector circuit 12 having a predetermined threshold voltage $V_1$, the output pulse width becomes one half. Thus, the rate of the pulse width of the pulse for driving the reset switch 19 for temporarily resetting the signal being held can be constant relative to the period of the output signal of the rotation detector. Further, since the incline of the trapezoidal wave becomes steep as the setting rotation number becomes large, the maximum amplitude of the trapezoidal wave shown in FIG. 10(c) can not be smaller than the threshold voltage of the blind secter circuit 12 of FIG. 9 and there is no risk of maloperation. If the pulse width of the pulse generating circuits 13 and 14 is changed inversely proportionally to the change of the setting of the rotation number such that the pulse width is made small when the setting rotation number becomes large, the relation between the pulse width of each of the pulses for driving the reset switch 19, the sampling switch 18 and the reset switch 17 and the relative position in time axis can be made constant with respect to the period of the output signal of the rotation number detector 4 regardless the rotation number of the motor, as shown in FIGS. 11(a), (b) and (c), while this could not be well in the case described above with respect to FIG. 6. Accordingly, if the constant current of the constant current source 16 is doubled by the signal externally applied to the terminal 15 of FIG. 8, the time necessary for the peak value of the saw tooth wave of the capacitor 20 to reach the voltage of the error amplifier 2 in FIG. 1 can be made one half, as shown in FIGS. 11(d) and (e). Further, the increase of ripple components appearing near the peak of the saw tooth waveform of the signal sampled and held in the capacitor 21 and the ripple components in the held voltage due to the actuation of the reset switch 19 prior to the sampling and holding is very little even if the setting rotation number is made large. Thus, it is possible to design the f-v converter which can sufficiently remove the ripple components without making a time constant of the low pass filter 23 large. Further, if the signal applied to the terminal is changed proportionally to the rotation number, a proportional f-v converted voltage can be obtained and therefore it becomes unnecessary to separately provide plural variable resisters corresponding to plural numbers of settings of the rotation number. Applying such a f-v converter to the circuit of FIG. 1, it is possible with a few adjusting variable resistors to realize plural numbers of settings of the rotation number so as to attain a stable rotation number control of a motor.

Figure 10:
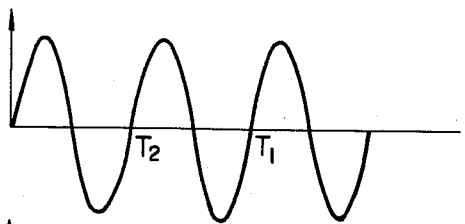
Figure 10:
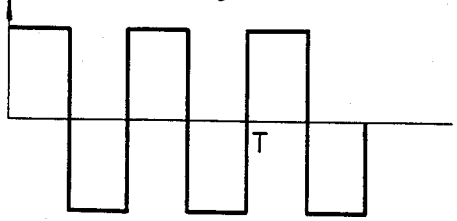
Figure 10:
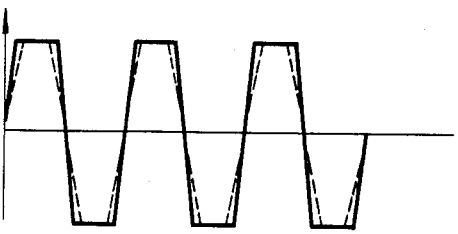
Figure 10:
Figure 10:
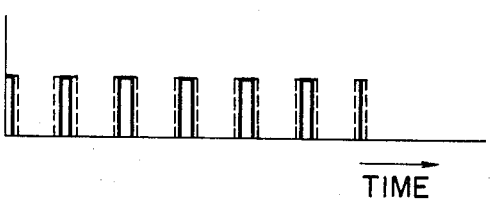
Figure 11:
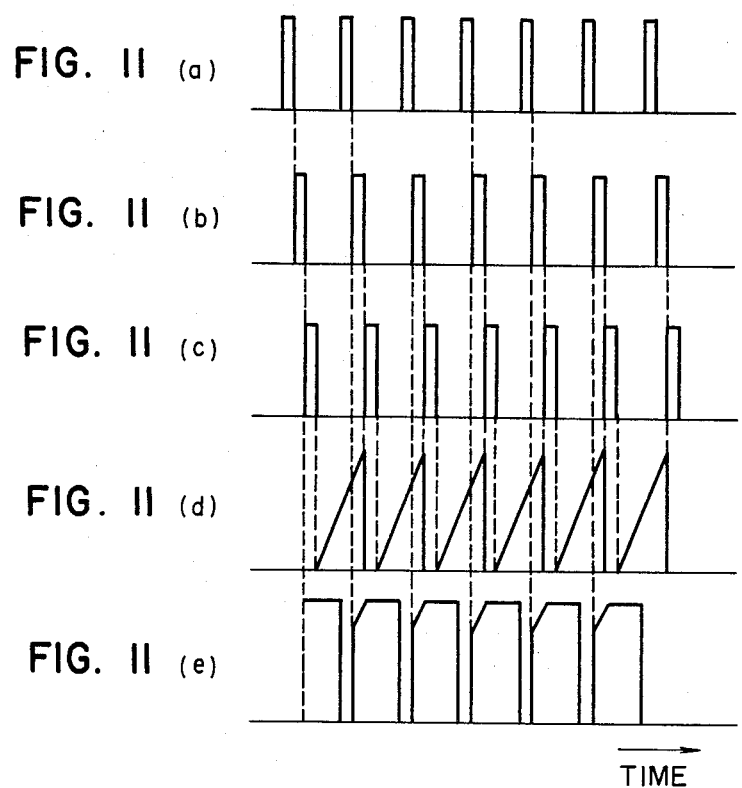

FIG. 9 illustrates a particular embodiment of the invention so far explained. The constant current source 16 is constituted by PNP transistors 55 and 56, resistors 47 and 48 and a variable resistor 36 for adjusting the speed setting so that the constant current is determined by the resistor 47, the adjusting variable resistor 36 and resistors 42~46. The setting of a desired rotation number is briefly made by changing the constant current by switching the resistors 42~46 by the switch 35, and then accurately made by means of the adjusting variable resistor 36. The PNP transistor 55 is connected as a diode to serve to compensate for temperature so as to make the current passing through the transistor 56 a constant current which is independent of tmeperature. The trapezoidal wave generating circuit 10 is constituted by a differential amplifier having a PNP transistor 57 as a constant current source and a pair of PNP transistors 58 and 61 as a differential pair, a current Miller circuit composed of NPN transistors 59 and 60, and a capacitor 22. The transistors 58 and 61 are alternately turned on and off so as to supply the constant current of the constant current source transistor 57 to the capacitor 22 to charge the capacitor 22 with the constant current. When the transistor 61 is turned off, the transistor 60 is turned on to discharge the capacitor 22 with the constant current to thereby convert the rectangular wave into a trapezoidal wave. In such an arrangement, the resistor 46 is first selected by the switch 35 so as to briefly set the rotation number to be a desired value and then the setting is accurately adjusted by the adjusting variable resistor 36. This variable resistor serves to accommodate the scatter in value of the external capacitor 20. Thus, the ratio of the constant current of the constant current source transistor 56 to the current passing through the resistor 46 has been set. Similarly, if the value of the resistor 49 has been determined, the ratio of the constant current of the constant current source transistor 57 to the current passing through the resistor 46 has been also determined. Next, if the switch 35 is caused to select the resistors 45, 44, 43 and 42 so as to change the ratio of current passing therethrough to set various rotation numbers, the constant current of each of the constant current source transistors 56 and 57 is also proportionally changed in accordance with the change of the current passing through the switch 35 to thereby proportionally change the incline of the trapezoidal wave of the trapezoidal wave generator 10. Further, similarly, if the pulse width of each of the pulse generating circuits 13 and 14 is proportionally changed, the rate of the pulse width of each of the sampling and reset pulses of the various switches 17, 18 and 19 can be made constant with respect to the whole period regardless the velocity setting. Further, if the values of the resistors 42~46 are selected to be sufficiently large with respect to the resistor 47, any velocity setting proportional to the values of the resistors 42~46 can be made after the value of the adjusting variable resistor 36 has been once set. FIGS. 10 and 11 show waveforms at various parts in such an arrangement as described above.

According to the present invention, as discussed above, the pulse width of the driving pulse for each of various sampling and reset switches constituting a f-v converter realized by sampling/holding the peak value of a saw tooth wave having a period proportional to the period of the rotation number is changed in accordance with the setting rotation number so as to make constant the pulse width with respect to the signal period proportional to the rotation period, resulting in reduction of the influence of the pulse width. Thus, there are following advantages in the embodiment of FIG. 9:

(1) It is possible to proportionally set plural numbers of velocities over a wide range by switching resistors so as to make it possible to reduce in number of the variable resistors;

(2) Since the sampled signal appearing across the holding capacitor includes few ripple components and therefore addition of current is not required, the drop of the constant current transistor is little and therefore the transistor is operative in a low current range;

(3) It is possible to make constant the ripple components in the output of the low-pass filter at any rotation number and to design a servo circuit which may attain a stable motor velocity control; and (4) It is possible to make substantially constant the signal level applied to the blind sector circuit 12 so that there occurs no maloperation of the blind sector circuit.

In the description made above, it has been assumed that for the purpose of simplicity of explanation, all of the incline of the trapezoidal wave and the various pulse widths shown in FIGS. 4(a)~(c) change in accordance with the setting of the rotation number of the motor. It is apparent, however, that it will be effective to change at least one of the incline and the various pulse widths as follows.

That is, first, even in the case where only the incline of the waveform generated by the trapezoidal wave generating circuit 10 in FIG. 8 is changed, it is possible to make constant the time occupied by the incline portion of the trapezoidal wave with respect to the signal period of the motor rotation number detector so that the threshold voltage of the blind sector circuit 12 is not exceeded downwardly, resulting in prevention of maloperation. Further, since it is possible to automatically make constant the occupation rate of the pulse width of the pulse for driving the switch 19 for resetting the capacitor 20 with respect to the signal period of the motor rotation number detector, it is possible to make constant regardless the setting rotation number the influence by the voltage drop due to resetting the voltage for holding the peak value of the saw tooth wave of FIG. 4(d).

Secondly, even if only the pulse width of the pulse generating circuit triggered by the output of the blind sector circuit 12 is changed, it is possible to make constant the occupation rate of the sampling pulse width of the sampling switch 18 driven by the changeable pulse width with respect to the period of the output signal of the motor rotation number detector and therefore it is possible to sample near the peak of the saw tooth wave.

Thirdly, even if only the pulse width of the pulse generator 14 is changed, it is possible to make constant the rate in time axis of the driving pulse width of the reset switch 17 driven by the changeable pulse width with respect to the period of the output signal of the motor rotation number detector and therefore it is possible to make the peak value of the saw tooth wave proportional to the signal period, resulting in improvement in the basic function of the f-v converter.

Each of the pulse generators 13 and 14 is a type of delay circuit triggerable by a pulse input and may be a triggerable monostable multivibrator. In order to make the pulse width from the delay circuit changeable it will do to change the current of a constant current source transistor 67 so as to change the current for charging a timing capacitor 72 as shown in FIG. 12 as in the well-known manner. In FIG. 12, the same reference numerals denote the same parts or components as in FIGS. 8 and 9. A transistor 68 serves to effect the triggering operation in response to a positive pulse applied to its base.

It has been said in the above description that to obtain a saw tooth wave, as shown in FIG. 2, the amplifier 8, the limiter 9, the trapezoidal wave generator 10, the full-wave rectifier 11, the blind sector circuit 12 and the pulse generating circuit 13 are used. This is for obtaining a saw tooth wave from a full-wave rectified signal in order to accurately control the rotation number of motor. Only for the purpose of obtaining a saw tooth wave, it will do to provide the changeable pulse width monostable multivibrator of FIG. 12 which is triggerable by the leading or trailing edge of the output waveform in place of the trapezoidal wave generating circuit 10, the full-wave rectifier 11 and the blind sector circuit 12.

According to the present invention, as described above, it is possible not only to make plural numbers of velocity settings but also to realize a f-v converter in which the range of setting is wide and the ripple components are few, so that a stable rotation number control can be performed.

What is claimed is:

1. A motor control apparatus for driving and controlling a motor, in which a signal frequency proportional to a rotation number of said motor is converted into a d.c. voltage by a frequency/voltage converter so as to drive and control said motor by said d.c. voltage, said frequency/voltage converter comprising:

a first, a second, and a third pulse generator for successively producing a first, a second, and a third repetitive pulse, respectively, in response to a signal having said signal frequency proportional to the rotation number of said motor;

a constant current source for supplying output current in accordance with a selected speed of rotation for said motor;

first reset means driven by said third pulse to reset the output current of said constant current source;

a first capacitor connected to said first reset means in parallel with said first reset means and charged by the output current of said constant current source;

sampling means driven by said second pulse to sample a saw tooth wave signal appearing across said first capacitor;

second reset means driven by said first pulse;

a second capacitor connected to said second reset means in parallel therewith for charging said saw tooth wave signal through said sampling means; and means responsive to the output current of said constant current source for changing a pulse width of at least one of said first, second and third pulses substantially in accordance with the output current of said constant current source.

2. A motor control apparatus according to claim 1, in which each of said first, second and third pulse generators includes a monostable multivibrator.

3. A motor control apparatus according to claim 2, in which said first pulse generator produces said first pulse at a frequency proportional to said signal frequency, said second pulse generator is triggered by a trailing edge of said first pulse to produce said second pulse, and said third pulse generator is triggered by a trailing edge of said second pulse to produce said third pulse.

4. A motor control apparatus according to claim 3, in which said first pulse generator comprises a first circuit for converting said signal having said signal frequency proportional to the rotation number of said motor into a rectangular wave, a second circuit for converting the rectangular wave into a trapezoidal wave by charging and discharging a capacitor by said rectangular wave with a constant current, a third circuit for full-wave rectifying the trapezoidal wave, and a blind sector circuit for allowing the full-wave rectified waveform to pass, and in which the constant current of said second circuit is changed in accordance with a change of said output current of said constant current source to change the incline of said trapezoidal wave so as to change the pulse width of said at least one pulse.

5. A motor control apparatus for driving and controlling a motor, in which a signal frequency proportional to a rotation number of said motor is converted into a d.c. voltage by a frequency/voltage converter so as to drive and control said motor by said d.c. voltage, said frequency/voltage converter comprising:
  a first pulse generator responsive to a signal having said signal frequency proportional to the rotation number of said motor for producing a first pulse having a frequency proportional to said signal frequency;
  a second pulse generator triggered by a trailing edge of said first pulse for generating a second pulse;
  a third pulse generator triggered by a trailing edge of said second pulse for generating a third pulse;
  a constant current source for providing an output current;
  a first capacitor grounded at its one end and connected at its other end to said constant current source to be charged by the output current of said constant current source;
  first reset means connected to said other end of said first capacitor and driven by said third pulse to discharge said first capacitor;
  sampling means driven by said second pulse to derive a saw tooth wave signal appearing across said first capacitor;
  a second capacitor for charging said saw tooth wave signal through said sampling means;
  second reset means connected to said second capacitor in parallel therewith and driven by said first pulse to discharge said second capacitor; and
  means responsive to the output current of said constant current source for changing a pulse width of at least one of said first, second and third pulses substantially in accordance with the output current of said constant current source.

6. A motor control apparatus according to claim 1, in which at least one of said first, second and third pulse generators includes a pulse delay circuit for providing a pulse with a changeable pulse width.

7. A motor control apparatus for driving and controlling a motor, in which a signal frequency proportional to a rotation number of said motor is converted into a d.c. voltage by a frequency/voltage converter so as to drive and control said motor using said d.c. voltage, said frequency/voltage converter comprising:
  (a) pulse train generating means receiving a continuous signal representative of a rotation of said motor for providing pulse trains having a frequency corresponding to said rotation number,
  (b) saw tooth signal generating means connected to a first current source and said pulse train generating means for generating a saw tooth signal having a rise inclination determined by a first current flowing into a capacitor from said first current source and an abrupt fall based on a discharge at said capacitor in a time-width of one of said pulse trains,
  (c) speed selection means responding to a selected rotation number of said motor for changing said first current,
  (d) sample-and-hold means connected to said saw tooth signal generating means and said pulse train generating means for providing a voltage for being sampled and held in a time-width of another of said pulse trains appearing closely before said one pulse train and discharged in a time-width of a further pulse train appearing closely before said another pulse train, and
  (e) control means responsive to said first current from said first current source for changing a pulse-width of at least one of said pulse trains in accordance with said first current.

8. A motor control apparatus according to claim 7, wherein said pulse train generating means comprises a capacitor charged by a second current source, and wherein said current control means controls a second current from said second current source to be proportional to said first current from said first current source.

9. A motor control apparatus for driving and controlling a motor, in which a signal frequency proportional to a rotation number of said motor is converted into a d.c. voltage by a frequency/voltage converter so as to drive and control said motor using said d.c. voltage, said frequency/voltage converter comprising:
  (a) shaping means for shaping a continuous signal representative of rotation of said motor into a rectangular wave signal,
  (b) constant current source means for providing constant current,
  (c) a trapezoidal wave generator for shaping said rectangular wave signal into a trapezoidal wave signal having a rise and fall inclination in accordance with an amplitude of said constant current,
  (d) a full-wave rectifier for rectifying said trapezoidal wave signal,
  (e) blind sector means having a predetermined threshold voltage for providing a first train of pulses having a width proportional to a width of said rise and fall inclination,
  (f) a first pulse generator receiving said first train of pulses for generating a second train of pulses delayed with respect to said first train,
  (g) second pulse generator receiving said second train of pulses for generating a third train of pulses delayed with respect to said second train,
  (h) a first capacitor connected to a current source for being gradually charged with current therefrom, said first capacitor being connected to a first switch means controlled by said third train of pulses so as to provide a saw tooth signal,
  (i) a second capacitor receiving said saw tooth signal through a second switch means controlled by said second train of pulses and discharging through a third switch means controlled by said first train of pulses os as to provide a voltage corresponding to a rise time of said saw tooth signal,
  (j) speed selection means connected to said current source and responsive to a selected rotation number of said motor for changing the current flowing from said current source to said first capacitor, and
  (k) connecting means connected to said current source and said trapezoidal wave generator for changing the amplitude of said constant current provided by said constant current source means in proportion to said current from said current source.

* * * * *